(12) United States Patent
Saure et al.

(10) Patent No.: US 10,890,430 B2
(45) Date of Patent: Jan. 12, 2021

(54) AUGMENTED REALITY-BASED SYSTEM WITH PERIMETER DEFINITION FUNCTIONALITY

(71) Applicant: LEICA GEOSYSTEMS AG, Heerbrugg (CH)

(72) Inventors: Matthias Saure, Buchs (CH); Michael Lettau, Laufenburg (DE)

(73) Assignee: LEICA GEOSYSTEMS AG, Heerbrugg (CH)

(*) Notice: Subject to any disclaimer, the term of this patent is extended or adjusted under 35 U.S.C. 154(b) by 16 days.

(21) Appl. No.: 16/271,605

(22) Filed: Feb. 8, 2019

(65) Prior Publication Data
US 2019/0242692 A1 Aug. 8, 2019

(30) Foreign Application Priority Data
Feb. 8, 2018 (EP) .................................. 18155893

(51) Int. Cl.
*G01B 11/00* (2006.01)
*G01B 11/24* (2006.01)
(Continued)

(52) U.S. Cl.
CPC .......... *G01B 11/005* (2013.01); *G01B 11/002* (2013.01); *G01B 11/24* (2013.01);
(Continued)

(58) Field of Classification Search
CPC ............................ G01B 11/005; G01C 15/002
See application file for complete search history.

(56) References Cited

U.S. PATENT DOCUMENTS

2014/0190025 A1* 7/2014 Giger .................. G01C 15/002
33/228
2015/0116356 A1 4/2015 Alon et al.
(Continued)

FOREIGN PATENT DOCUMENTS

| CN | 104335227 A | 2/2015 |
| CN | 106017436 A | 10/2016 |

(Continued)

OTHER PUBLICATIONS

European Search Report dated Apr. 26, 2018 as received in Application No. 18155893.3.

*Primary Examiner* — Samantha (Yuehan) Wang
(74) *Attorney, Agent, or Firm* — Maschoff Brennan

(57) ABSTRACT

An Augmented Reality (AR)-based inspection system comprising a coordinate measuring instrument having a first camera unit, a first computer unit, and a first communication unit, and an AR-device having a second camera unit, a second computer unit, and a second communication unit, wherein the first and the second communication units are connectable, each of the coordinate measuring instrument and the AR-device is configured for establishing a referenced status relative to a setting, at least one of the first and the second computer unit is configured for detecting two-dimensional or three-dimensional structured shapes in images captured by at least one of the first and second camera unit. The AR-device is configured for providing a real view of the setting, providing overlays onto the real view according to corresponding AR-data, wherein said AR-data are at least in part spatially associated with the detected structured shapes.

15 Claims, 2 Drawing Sheets

(51) Int. Cl.
*G06T 7/70* (2017.01)
*G06K 9/00* (2006.01)
*G01C 15/00* (2006.01)
G06F 3/0482 (2013.01)

(52) U.S. Cl.
CPC ....... *G01C 15/002* (2013.01); *G06K 9/00671* (2013.01); *G06T 7/70* (2017.01); G06F 3/0482 (2013.01)

(56) References Cited

U.S. PATENT DOCUMENTS

| | | |
|---|---|---|
| 2015/0354954 A1 | 12/2015 | Nishita |
| 2016/0093099 A1 | 3/2016 | Bridges |
| 2016/0314593 A1* | 10/2016 | Metzler ................ G01C 15/002 |
| 2017/0330377 A1 | 11/2017 | Akselrod et al. |
| 2019/0094021 A1* | 3/2019 | Singer .................... G01C 15/00 |

FOREIGN PATENT DOCUMENTS

| | | | | |
|---|---|---|---|---|
| CN | 106648071 A | 5/2017 | | |
| JP | 4677613 B2 * | 5/2006 | ............. | G01B 11/24 |
| JP | 2016170060 A | 9/2016 | | |
| WO | WO2019185153 A1 * | 3/2018 | ........... | G01B 11/002 |

* cited by examiner

AUGMENTED REALITY-BASED SYSTEM WITH PERIMETER DEFINITION FUNCTIONALITY

CROSS-REFERENCE TO RELATED APPLICATIONS

This application claims priority to European Patent Application No. 18155893.3, filed on Feb. 8, 2018. The foregoing patent application are incorporated herein by reference.

FIELD OF INVENTION

The present invention relates to an inspection system comprising a coordinate measuring instrument and an Augmented Reality (AR)-device.

BACKGROUND

A coordinate measuring instrument of a system according to the invention could be a laser tracker, a laser scanner, a camera system, an articulated arm, a tachymeter, a theodolite, or a total station. Such coordinate measuring instruments feature single point measurements, and in particular also tracking, of near and far objects, and work based on time of flight laser technology, image processing technology, or angle encoder technology.

A measurement process with such a coordinate measuring instrument can be quite complex and time-consuming, and often requires a high level of skill. A particular difficulty is the detection of objects to be measured, and the targeting itself.

Unfortunately, inspection systems in the art lack automation and ergonomics for such targeting procedures. Especially a seamless and immediate interaction between a user and a coordinate measuring instrument is not provided by inspection systems available on the market.

It is therefore an object of the present invention to provide an improved inspection system with respect to ergonomics and efficiency.

BRIEF DESCRIPTION OF THE INVENTION

Some aspects of the invention relate to an Augmented Reality (AR)-based inspection system comprising a coordinate measuring instrument having a first camera unit, a first computer unit, and a first communication unit, and an AR-device having a second camera unit, a second computer unit, and a second communication unit, wherein the first and the second communication units are connectable, each of the coordinate measuring instrument and the AR-device is configured for establishing a referenced status relative to a setting, at least one of the first and the second computer unit is configured for detecting two-dimensional or three-dimensional structured shapes in images captured by at least one of the first and second camera unit, and the AR-device is configured for providing a real view of the setting, providing overlays onto the real view according to corresponding AR-data, wherein said AR-data are at least in part spatially associated with the detected structured shapes, receiving a selection of an overlay, and transmitting a trigger signal to the coordinate measuring instrument based on the selected overlay, wherein the trigger signal is configured to induce the coordinate measuring instrument to measure at least part of the structured shape, which structured shape is associated with the AR-data corresponding to the selected overlay.

A structured shape may be any methodically/systematically formed contour, outline, or edge. Particular examples are geometrical shapes like lines, surfaces, curves, manifolds, symmetries, rectangles, circles, and ellipsoids. Such structures may be detected by contrast or colour analysis of the image information or by other image processing algorithms.

Establishing a referenced status relative to the setting can for example be achieved by a computer vision technique and/or with help of referencing markers placed in the setting. In particular, the AR-device can additionally or alternatively be configured for establishing a referenced status relative to the coordinate measuring instrument. For this referencing functionality, the coordinate measuring instrument may comprise identification features which can be detected by the AR-device and used for determining the pose of the AR-device relative to the coordinate measuring instrument. Once referenced to the coordinate measuring instrument, the AR-device may communicate the pose data to the coordinate measuring instrument. On side of the coordinate measuring instrument, establishing a referenced status relative to the setting can for example be achieved by a scanning a point cloud of the setting of which the 3D model is known, or by targeting and precisely measuring several reference targets of which the 3D coordinates are known.

In case the AR-device provides the real view of the setting through a transparent visor (such as on glasses or on a head mounted display helmet), the overlays can be projections projected onto the visor by a projector comprised by the AR-device. In case the AR-device provides the real view of the setting on a screen (such as on smart phones, tablet PCs, or display goggles), the overlays can be graphics displayed over the video stream on the screen.

The overlays are provided according to AR-data, which at least comprise information about the visual appearance of the overlays and the shape and dimensions of the overlays defined by 3D coordinates. Due to the referenced status of the AR-device relative to the setting and due to the availability of the AR-data, the computer unit of the AR-device is capable of determining where to provide the overlays with reference to the field of view of the user. Generally, the AR-data are spatially associated with certain locations in the setting. At least part of the AR-data are spatially associated with structured shapes of structure in the setting, which structured shapes have been detected in the images recorded by the first and/or the second camera unit by means of image processing.

The reception of a selection of an overlay may be realised in many different ways. In a particular example of an inspection system according to the invention, such a selection may be performed by a user (who is carrying the AR-device) in that the user points with a finger or any pointing device at what he perceives as an overlay associated with a detected structured shape. At least one of the first and second camera units may be configured for recognising this pointing gesture and matching the position of the finger tip with an accordingly located overlay. Another example of selecting an overlay could be a scroll wheel on the AR-device by which a user can scroll through a plurality of overlays assigned to the detected structured shapes, wherein the currently chosen may be marked graphically. With another control function (e.g. pressing the scroll wheel), the selection of a currently chosen overlay can be confirmed, which automatically causes the AR-device to transmit the trigger signal.

The trigger signal may comprise a triggering component, and a coordinatewise component.

The triggering component may be embodied as information in machine language about the specific task to be done, i.e. a measuring command. The coordinatewise component of the trigger signal then may merely comprise at least one 3D coordinate which the coordinate measuring instrument can target at and measure.

The first communication unit may be configured for receiving the trigger signal, and the first computer unit may be configured for translating the trigger signal into control parameters for the coordinate measuring instrument.

The second communication unit of the AR-device, accordingly, may be configured for transmitting the trigger signal to the first communication unit of the coordinate measuring instrument.

The translation of the trigger signal into control parameters may comprise an interpretation of the command behind the triggering component of the trigger signal, and a transformation of the 3D coordinates behind the coordinative component of the trigger signal from a coordinate system of the AR-device into a coordinate system of the coordinate measuring instrument. It is also possible that the 3D coordinates are already expressed with reference to a global coordinate system, which may be linked to the setting.

In a particular embodiment of the invention, it is the second computer unit that is configured for detecting the structured shapes and generating the AR-data based on the detected structured shapes.

In another embodiment of the invention, it is the first computer unit is configured for detecting the structured shapes and generating the AR-data based on the detected structured shapes.

It is also possible both the first computer and the second computer are configured for detecting the structured shapes and generating the AR-data based on the detected structured shapes.

The coordinate measuring instrument may be configured for determining whether the structured shape associated with the generated AR-data is accessible by the coordinate measuring instrument or blocked by an obstacle from the perspective of the coordinate measuring instrument.

This functionality is useful in case the second camera unit (of the AR-device) has detected the structured shape because it is possible said structured shape is in view of the AR-device but obstructed from a perspective of the coordinate measuring instrument.

The structured shape is accessible by the coordinate measuring instrument for example when a measuring beam transmitted by the coordinate measuring instrument can reach the structured shape, or when a measuring probe of the coordinate measuring instrument can reach the structured shape.

At least one of the coordinate measuring instrument, the AR-device, and an external computer may be configured for generating AR-data based on said obstacle.

An external computer may be embodied as a server wirelessly connected with at least the AR-device, and particularly also with the coordinate measuring instrument, thereby managing the inspection procedure.

Such AR-data based on the obstacle can comprise at least one of a warning notice stating that the selected structured shape is out of view from the perspective of the coordinate measuring instrument (and that, consequently, a measurement of the selected structured shape is not possible), and an indicator suggesting where to place the coordinate measuring instrument (instead, such that the selected structured shape is not any more out of view from the perspective of the coordinate measuring instrument).

For example, the coordinate measuring instrument can be embodied as one of a laser tracker, a laser scanner, a total station, an articulated arm coordinate measuring machine, and a camera system.

The AR-device on the other hand may be embodied as one of a tablet computer, a smart phone, AR-glasses, and an AR-helmet.

Some aspects of the invention also relate to a method of Augmented Reality (AR)-based inspecting structured shapes in a setting, comprising the steps: providing a coordinate measuring instrument having a first camera unit, a first computer unit, and a first communication unit, providing an AR-device having a second camera unit, a second computer unit, and a second communication unit, connecting the first and the second communication units, with each of the coordinate measuring instrument and the AR-device, establishing a referenced status relative to a setting, with at least one of the first and the second computer unit, detecting structured shapes of structure in images captured by at least one of the first and second camera unit, and with the AR-device: providing a real view of the setting, providing overlays onto the real view according to corresponding AR-data, wherein said AR-data are at least in part spatially associated with the detected structured shapes, receiving a selection of an overlay, and transmitting a trigger signal to the coordinate measuring instrument based on the selected overlay, wherein the trigger signal is configured to induce the coordinate measuring instrument to measure at least part of the structured shape, which structured shape is associated with the AR-data corresponding to the selected overlay.

The method may comprise with the second communication unit, receiving the trigger signal, and with the second computer unit, translating the trigger signal into control parameters for the coordinate measuring instrument.

The method may comprise with the second computer unit, detecting the structured shapes and generating the AR-data based on the detected structured shapes.

The method may comprise with the first computer unit, detecting the structured shapes and generating the AR-data based on the detected structured shapes.

The method may further comprise with the coordinate measuring instrument, determining whether the structured shape associated with the generated AR-data is accessible by the coordinate measuring instrument or blocked by an obstacle from the perspective of the coordinate measuring instrument, and generating AR-data based on the obstacle, wherein the AR-data comprise at least one of a warning notice stating that the selected structured shape is out of view from the perspective of the coordinate measuring instrument, and an indicator suggesting where to place the coordinate measuring instrument such that the selected structured shape is not any more out of view from the perspective of the coordinate measuring instrument.

DESCRIPTION OF THE DRAWINGS

In the following, the invention will be described in detail by referring to exemplary embodiments that are accompanied by figures, in which.

DETAILED DESCRIPTION

Figure 1:
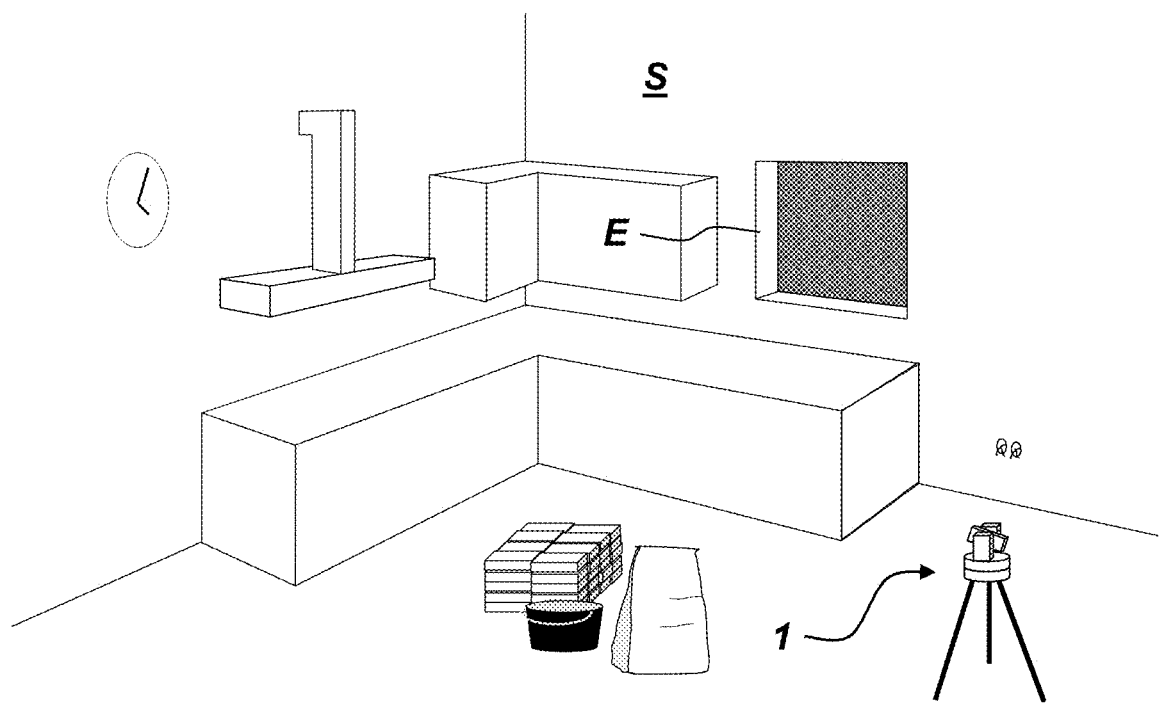
FIG. 1: shows, from a view through an exemplary AR-device, a setting in which an exemplary system according to the invention is set up.

FIG. 1 shows an exemplary setting S wherein an AR-device is worn by a user (not shown because FIG. 1 shows what a user is seeing when he looks through or at the AR-device) and wherein a coordinate measuring instrument 1 is placed on the floor of the setting. In this embodiment of the inspection system, the coordinate measuring instrument shall be a laser tracker, which is a surveying instrument having a laser unit, an elevative unit, and an azimutal unit. The azimutal unit placed on a tripod and is rotatable about a vertical axis, wherein a first angle encoder can measure this azimutal rotation. The elevative unit is arranged on the azimutal unit and is rotatable about a horizontal axis, wherein a second angle encoder can measure this elevative rotation. By the two rotations, a laser beam emitted by the laser unit can be pointed at various solid angles. The laser tracker can measure points in the setting by a distance measurement (e.g. time of flight, multiple frequency phase-shift, interferometry, laser radar, or frequency modulated continuous wave) and the angles measured by the first and second angle encoders.

Both the AR-device and the coordinate measuring instrument are configured for referencing themselves relative to the setting. For example, if a 3D-model of the setting is provided to a computer unit of the AR-device or the coordinate measuring instrument, the structure captured by the respective camera unit can be compared to that known 3D-model. Alternative referencing methods can be based on VSLAM, referencing marker recognition, image feature detection, or other computer vision based methods.

The setting S is a kitchen having several object edges E as structured shapes. By means of a camera unit of the AR-device or a camera unit of the coordinate measuring instrument, structured shapes viewable to the respective camera unit can be recognised by means of image processing. An image processing algorithm may be designed to detect at least one certain type of shapes, such as straight lines or curvatures, but in particular a variety of different geometrical shapes.

Figure 2:
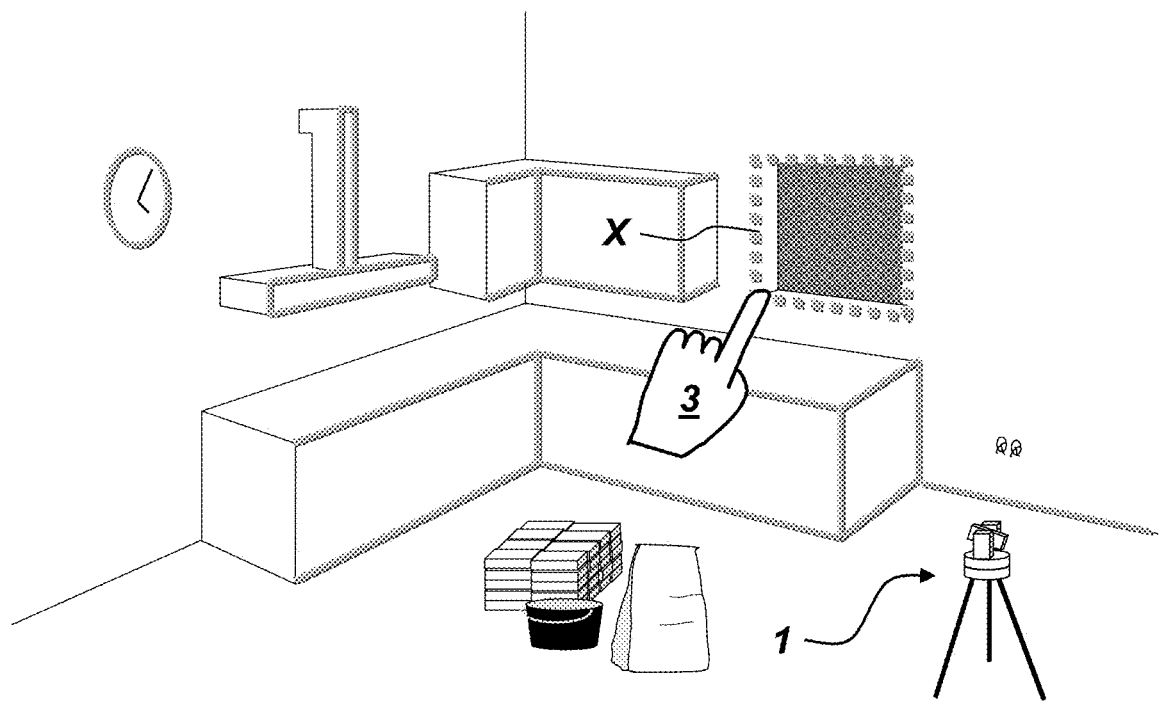
FIG. 2: shows part of an embodiment of a method according to the invention, wherein in the view of FIG. 1, overlays marking detected structured shapes and one selected structured shape are provided.

FIG. 2 shows how the detected structured shapes are marked in the view provided by the AR-device such that the user can perceive them immediately. The structured shapes have been detected by the camera unit of the coordinate measuring instrument from its current standpoint. It can be recognised that obstructed structured shapes from the perspective of the coordinate measuring instrument are not marked in the view provided by the AR-device, since they have not been detected by the coordinate measuring instrument. The marking can take place by means of coloured lines or similar graphical highlighting. The markings are overlaid on the real view of the setting in a spatially linked manner, such that the user perceives the overlays linked to real world locations. When he turns the head, the overlays will remain with their assigned location in the setting, i.e. the line markings in FIG. 2 will remain overlaid onto the structured shapes of the kitchen.

In the shown embodiment, the system allows a user to select one or more of the detected structured shapes by pointing on it with his hand 3. In this case, the AR-device or, more specifically, the camera unit comprised by the AR-device, is configured for detecting user gestures like pointing at objects. Since the camera unit of the AR-device has a similar point of origin as the eye of the user (or at least the parallax between the two is known), it is possible to determine what the finger is pointing at based on the pixels where the pointing finger is captured.

A selection can however take place also in a different way. For example, a user can switch between the detected structured shapes by means of user interface other than the gesture recognition. As a feedback, the currently chosen structured shape can be highlighted differently compared to the non-chosen structured shapes. With a further confirmation input, the user can finally select the currently chosen structured shape.

The selected edge X can be marked as a structured shape in the view provided by the AR-device in a way differing from the marking of the other detected (and "non-selected") structured shapes. In the shown example, the selected structured shape is marked with dashed highlighted lines.

Figure 3:
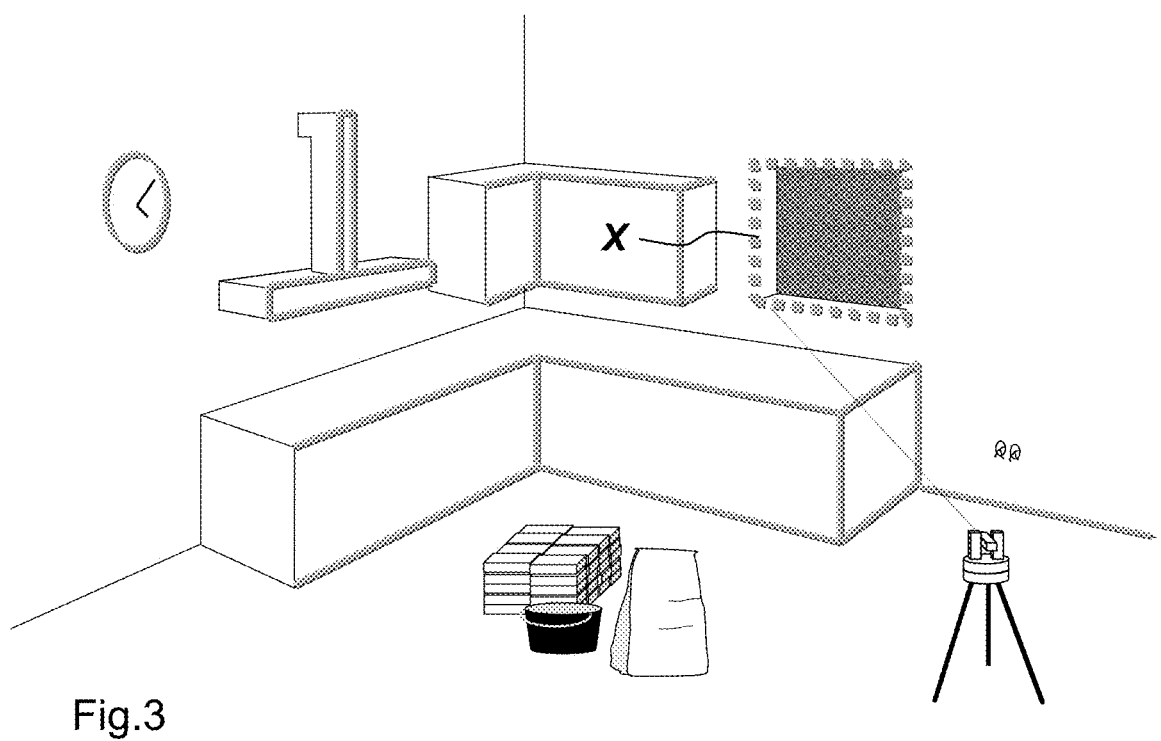
FIG. 3: shows part of an embodiment of a method according to the invention, wherein a coordinate measuring instrument is measuring a selected structured shape.

What this selection is triggering, is shown in FIG. 3. After the selection X of the window edge (see FIG. 2), the coordinate measuring instrument 1 is targeting the selected edge and begins to measure it. For example, only one point of the edge X is measured, or the whole edge is measured. In the latter case, the coordinate measuring instrument can guide the laser beam along the edge, thereby continuously taking measurements.

Figure 4:
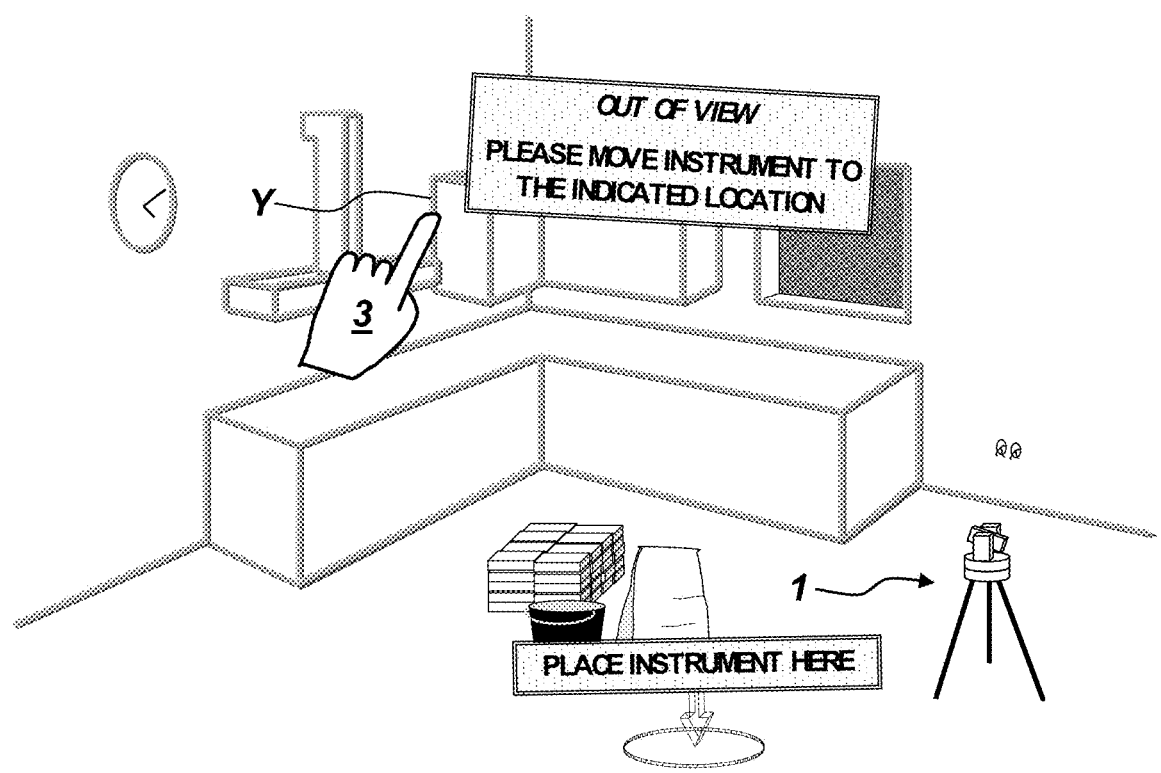
FIG. 4: shows part of an embodiment of a method according to the invention, wherein the user is advised to relocate the coordinate measuring instrument.

FIG. 4 is showing an embodiment of the invention, wherein the structured shapes in the setting are detected by a camera unit comprised by the AR-device. As a result, more/other structured shapes are detected since the perspective of the camera unit of the AR-device is differing from the one of the coordinate measuring instrument.

In case the AR-device then receives a selection of a structured shape Y, which is not accessible by the coordinate measuring instrument, the system can be configured to recognise this conflict and provide overlays (based on according AR-data) which indicate to the user wearing the AR-device that a relocation of the coordinate measuring instrument would be required to perform the measurement of the selected structured shape.

Although the invention is illustrated above, partly with reference to some preferred embodiments, it must be understood that numerous modifications and combinations of different features of the embodiments can be made. All of these modifications lie within the scope of the appended claims.

What is claimed is:

1. An Augmented Reality (AR)-based inspection system comprising:
    a coordinate measuring instrument having a first camera unit, a first computer unit, and a first communication unit, and
    an AR-device having a second camera unit, a second computer unit, and a second communication unit, wherein:
        the first and the second communication units are connectable,
        each of the coordinate measuring instrument and the AR-device is configured for:
            establishing a referenced status relative to a setting,
        at least one of the first and the second computer unit is configured for:
            detecting two-dimensional or three-dimensional structured shapes in images captured by at least one of the first and second camera unit, and the AR-device is configured for:
providing a real view of the setting,
providing overlays onto the real view according to corresponding AR-data, wherein said AR-data are at least in part spatially associated with the detected structured shapes,
receiving a selection of an overlay, and
transmitting a trigger signal to the coordinate measuring instrument based on the selected overlay, wherein the trigger signal is configured to induce the coordinate measuring instrument to measure at least part of the structured shape, which structured shape is associated with the AR-data corresponding to the selected overlay.

2. The AR-based inspection system according to claim 1, wherein the trigger signal comprises:
a triggering component, and
a coordinate wise component.

3. The AR-based inspection system according to claim 1, wherein:
the first communication unit is further configured to receive the trigger signal, and
the first computer unit is further configured to translate the trigger signal into control parameters for the coordinate measuring instrument.

4. The AR-based inspection system according to claim 1, wherein:
the second computer unit is further configured to:
detect the structured shapes, and
generate the AR-data based on the detected structured shapes.

5. The AR-based inspection system according to claim 1, wherein:
the first computer unit is further configured to:
detect the structured shapes, and
generate the AR-data based on the detected structured shapes.

6. The AR-based inspection system according to claim 5, wherein:
the coordinate measuring instrument is configured to:
determine whether the structured shape associated with the generated AR-data is accessible by the coordinate measuring instrument or blocked by an obstacle from the perspective of the coordinate measuring instrument.

7. The AR-based inspection system according to claim 6, wherein:
at least one of the coordinate measuring instrument, the AR-device, and an external computer is configured to generate AR-data based on the obstacle.

8. The AR-based inspection system according to claim 7, wherein the AR-data comprises at least one of:
a warning notice stating that the selected structured shape is out of view from the perspective of the coordinate measuring instrument, and
an indicator suggesting where to place the coordinate measuring instrument such that the selected structured shape is not any more out of view from the perspective of the coordinate measuring instrument.

9. The AR-based inspection system according to claim 1, wherein the coordinate measuring instrument is embodied as one of a laser tracker, a laser scanner, a total station, an articulated arm coordinate measuring machine, and a camera system.

10. The AR-based inspection system according to claim 1, wherein the AR-device is embodied as one of a tablet computer, a smart phone, AR-glasses, and an AR-helmet.

11. A method of Augmented Reality (AR)-based inspecting structured shapes in a setting, the method comprising:
providing a coordinate measuring instrument having a first camera unit, a first computer unit, and a first communication unit,
providing an AR-device having a second camera unit, a second computer unit, and a second communication unit,
connecting the first and the second communication units,
with each of the coordinate measuring instrument and the AR-device, establishing a referenced status relative to a setting,
with at least one of the first and the second computer unit, detecting structured shapes of structure in images captured by at least one of the first and second camera unit, and
wherein the AR-device is configured for:
providing a real view of the setting,
providing overlays onto the real view according to corresponding AR-data, wherein said AR-data are at least in part spatially associated with the detected structured shapes,
receiving a selection of an overlay, and
transmitting a trigger signal to the coordinate measuring instrument based on the selected overlay, wherein the trigger signal is configured to induce the coordinate measuring instrument to measure at least part of the structured shape, which structured shape is associated with the AR-data corresponding to the selected overlay.

12. The method according to claim 11, further comprising:
with the second communication unit, receiving the trigger signal, and
with the second computer unit, translating the trigger signal into control parameters for the coordinate measuring instrument.

13. The method according to claim 11, further comprising:
with the second computer unit, detecting the structured shapes and generating the AR-data based on the detected structured shapes.

14. The method according to claim 11, further comprising:
with the first computer unit, detecting the structured shapes and generating the AR-data based on the detected structured shapes.

15. The method according to claim 11, wherein the coordinate measuring instrument is configured to:
determine whether the structured shape associated with the generated AR-data is accessible by the coordinate measuring instrument or blocked by an obstacle from the perspective of the coordinate measuring instrument, and
generate AR-data based on the obstacle, wherein the AR-data comprise at least one of a warning notice stating that the selected structured shape is out of view from the perspective of the coordinate measuring instrument, and an indicator suggesting where to place the coordinate measuring instrument such that the selected structured shape is not any more out of view from the perspective of the coordinate measuring instrument.

* * * * *